United States Patent [19]

Rae

[11] Patent Number: 4,845,341
[45] Date of Patent: Jul. 4, 1989

[54] HEATING SYSTEM, CONTROL DEVICE THEREFOR AND METHODS OF MAKING THE SAME

[75] Inventor: Richard H. Rae, Henrico County, Va.

[73] Assignee: Robertshaw Controls Company, Richmond, Va.

[21] Appl. No.: 180,397

[22] Filed: Apr. 12, 1988

[51] Int. Cl.⁴ ............................................. H05B 1/02
[52] U.S. Cl. .................................. 219/497; 219/492; 219/442; 219/494; 340/589
[58] Field of Search ............... 219/506, 492, 494, 442, 219/497, 499, 491, 501, 419, 441; 340/588, 589; 236/20 A, 374

[56] References Cited

U.S. PATENT DOCUMENTS

| | | | |
|---|---|---|---|
| 4,278,872 | 7/1981 | Koether et al. | 219/497 |
| 4,465,228 | 8/1984 | Mori et al. | 236/20 A |
| 4,549,527 | 10/1985 | Davis | 126/374 |
| 4,570,054 | 2/1986 | Chidzey et al. | 340/589 |
| 4,614,860 | 9/1986 | Kativois | 340/589 |
| 4,629,852 | 12/1986 | Andre | 340/589 |
| 4,730,101 | 3/1988 | Mahon | 340/589 |

Primary Examiner—M. H. Paschall
Attorney, Agent, or Firm—Candor, Candor & Tassone

[57] ABSTRACT

A heating system, a deep fat fryer, control devices therefor and methods of making the same are provided, the control device comprising a temperature sensing unit for sensing the actual temperature of the output heating effect of a heat producing unit, and a setpoint unit for selecting a desired setpoint temperature that the heat producing unit is to provide with the output heating effect thereof, the control device being so constructed and arranged that the same is adapted to tend to cause the heat producing unit to provide the desired setpoint temperature with the output heating effect thereof, the control device being so constructed and arranged that the same is adapted to turn off the heat producing unit if the actual rate of change of the temperature of the output heating effect thereof is greater than a target rate of change thereof when the actual temperature of the output heating effect at that time is below the desired setpoint temperature and to turn on the heat producing unit if the actual rate of temperature change of the output heating effect thereof is less than the target rate of change when the actual temperature of the output heating effect thereof at that time is below the desired setpoint temperature where the target rate of change is based upon the formula $Stb=(Tsp-T)\cdot S$ where $Stb$ is the target rate of change, $Tsp$ is the desired setpoint temperature, $T$ is the actual temperature of the output heating effect and $S$ is a selected constant that comprises a sensitivity factor.

21 Claims, 1 Drawing Sheet

HEATING SYSTEM, CONTROL DEVICE THEREFOR AND METHODS OF MAKING THE SAME

BACKGROUND OF THE INVENTION

1. Field of the Invention

This invention relates to a new heating system, a new deep fat fryer and a new control means therefor as well as to new methods of making the same.

2. Prior Art Statement

It is known to provide a control means for a heating system that has a heat producing means, the control means comprising temperature sensing means for sensing the actual temperature of the output heating effect of the heat producing means, and setpoint means for selecting a final desired setpoint temperature that the heat producing means is to provide with the output heating effect thereof, the control means having means to tend to cause the heat producing means to provide the desired setpoint temperature with the output heating effect thereof. For example, see the U.S. patent to Koether et al, U.S. Pat. No. 4,278,872; the U.S. patent to Davis, U.S. Pat. No. 4,549,527 and the U.S. patent to Mori et al, U.S. Pat. No. 4,465,228.

SUMMARY OF THE INVENTION

One feature of this invention is to provide a new control means for a heating system that has a heat producing means, such as for a deep fat fryer, wherein the control means can provide a performance far superior to that of a simple setpoint control means.

In particular, it is well known that due to thermal resistances and lags, temperature control via a simple setpoint control means can result in undesirable responses and this is particularly true in a deep fryer where the termination of heat input, when the setpoint temperature is reached, will result in a massive temperature overshoot.

Accordingly, it was found according to the teachings of this invention that a new control means can be provided wherein the same controls the heat producing means by regulating the actual rate of change of the temperature of the output heating effect thereof as the actual temperature of that output heating effect rises from a temperature below the selected setpoint temperature toward the selected setpoint temperature whereby the aforementioned temperature overshoot problem is substantially reduced or eliminated.

For example, one embodiment of this invention provides a control means for a heating system that has a heat producing means, the control means comprising temperature sensing means for sensing the actual temperature of the output heating effect of the heat producing means, and setpoint means for selecting a final desired setpoint temperature that the heat producing means is to provide with the output heating effect thereof, the control means having means to tend to cause the heat producing means to provide the desired setpoint temperature with the output heating effect thereof, the control means having means for turning off the heat producing means if the actual rate of change of the temperature of the output heating effect thereof is greater than a target rate of change thereof when the actual temperature of the output heating effect at that time is below the desired setpoint temperature and to turn on the heat producing means if the actual rate of temperature change of the output heating effect thereof is less than the target rate of change when the actual temperature of the output heating effect thereof at that time is below the desired setpoint temperature where the target rate of change is based upon or derived from the formula $Stb = (Tsp - T) \cdot S$ where Stb is the target rate of change, Tsp is the desired setpoint temperature, T is the actual temperature of the output heating effect and S is a selected constant that comprises a sensitivity factor.

Accordingly, it is an object of this invention to provide a new control means for a heating system that has a heat producing means, the control means of this invention having one or more of the novel features of this invention as set forth above or hereinafter shown or described.

Another object of this invention is to provide a new heating system that has one or more of the novel features of this invention as set forth above or hereinafter shown or described.

Another object of this invention is to provide a new deep fat fryer having one or more of the novel features of this invention as set forth above or hereinafter shown or described.

Another object of this invention is to provide a new method of making a control means for a heating system that has a heat producing means, the method of this invention having one or more of the novel features of this invention as set forth above or hereinafter shown or described.

Another object of this invention is to provide a new method of making a heating system, the method of this invention having one or more of the novel features of this invention as set forthe above or hereinafter shown or described.

Another object of this invention is to provide a new method of making a deep fat fryer, the method of this invention having one or more of the novel features of this invention as set forth above or hereinafter shown or described.

Other objects, uses and advantages of this invention are apparent from the reading of this description which proceeds with reference to the accompanying drawings forming a part thereof and wherein:

DESCRIPTION OF THE PREFERRED EMBODIMENT

Figure 1:
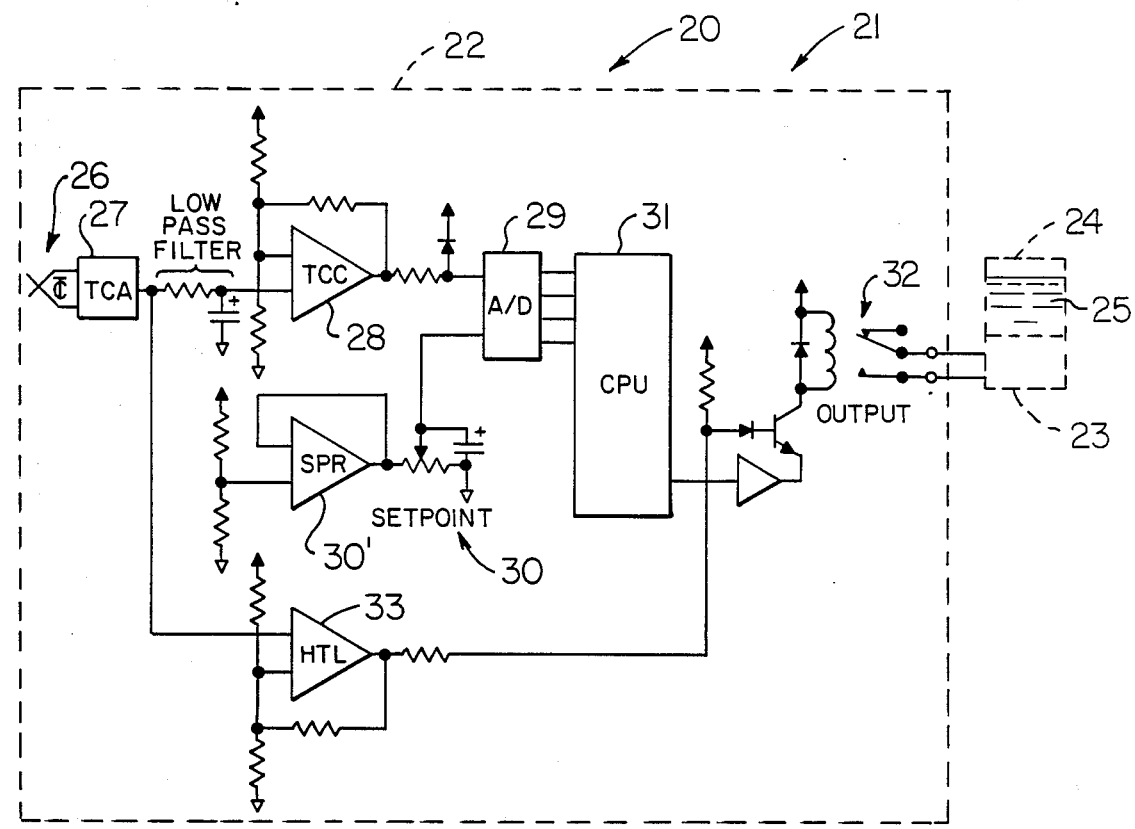
FIG. 1 is a schematic view illustrating the new deep fat fryer of this invention, the new deep fat fryer of FIG. 1 including the new heating system of this invention and the new control means of this invention therein.

While the various features of this invention are hereinafter described and illustrated as being particularly adapted to provide means for controlling a deep fat fryer, it is to be understood that the various features of this invention can be utilized singly or in various combinations thereof to provide means for controlling the heat producing means of other apparatus and structure as desired.

Therefore, this invention is not to be limited to only the embodiment illustrated in the drawings, because the drawings are merely utilized to illustrate one of the wide variety of the uses of this invention.

Referring now to FIG. 1, the new deep fat fryer of this invention is generally indicated by the reference numeral 20 and utilizes a heating system of this invention that is generally indicated by the reference numeral 21, the deep fat fryer 20 and the heating system 21 each utilizing a new control means of this invention that is indicated by the reference numeral 22.

The deep fat fryer 20 and the heating system 21 include a heat producing means 23 that can generate heat when turned on in a manner hereinafter set forth, the heat producing means 23 being adapted to produce heat by utilizing any suitable energy source (not shown), such as gaseous fuel, electrical power, etc., as desired.

The deep fat fryer 20 includes a vat means 24 for containing cooking oil 25 therein to be heated by the heating means 23 to a desired selected temperature, the general operation of a vat means for cooking food with cooking oil that is heated by a heat producing means being well known in the art as set forth in the aforementioned U.S. patent to Koether et al, U.S. Pat. No. 4,278,872, and the U.S. patent to Davis, U.S. Pat. No. 4,549,527, whereby these two patents are being incorporated into this disclosure by this reference thereto.

The control means 22 of this invention as illustrated in FIG. 1 comprises a temperature sensing means that is generally indicated by the reference numeral 26 for sensing the actual temperature of the cooking oil 25 in the vat means 24, the temperature sensing means 26 in one working embodiment of the control means 22 of this invention comprising a thermocouple that drives a thermocouple amplifier 27. The output of the thermocouple amplifier 27 is conditioned and level shifted by a thermocouple amplifier conditioner 28 which has its output applied to one input of a multi-channel analog to digital convertor 29 for a purpose hereinafter set forth.

The control means 22 also comprises a setpoint means that is generally indicated by the reference numeral 30 and is adapted to permit an operator to select the desired setpoint temperature for the deep fat fryer 20, the setpoint means 30 in the one working embodiment of the invention comprising a potentiometer that is driven by a regulated setpoint reference voltage means 30'in a manner well known in the art. The output of the setpoint means 30 is applied to another input of the analog to digital convertor 29 as illustrated in FIG. 1 for a purpose hereinafter set forth.

The control means 22 further comprises a microprocessor 31 that is adapted to be programmed with the new formula of this invention as hereinafter set forth and is operatively interconnected to the ouput means of the analog to digital convertor 29 and to a relay means that is generally indicated by the reference numeral 32 and that controls the operation of the heating means 23 in a manner well known in the art as the microprocessor 31 can turn on the heating means 23 through the relay means 32 and turn off the heating means 23 through the relay means 32 as is well known in the art.

If desired, the control means 22 can include means 33 which is operatively interconnected to the temperature sensing means 26 and to the relay means 32 for shutting down the operation of the heat producing means 23 should the actual temperature of the cooking oil 25 exceed a certain high temperature limit for reasons well known in the art.

As previously stated, it was found according to the teachings of this invention that simple setpoint controls have a tendency to overshoot as the heat producing means is operating to raise the temperature of the output temperature effect thereof from below the selected setpoint temperature to the setpoint temperature and that such temperature overshooting is particularly true in a deep fat fryer.

However, it was found according to the teachings of this invention that a desired rate of change curve can be provided that is asymptotic to the selected setpoint temperature so as to tend to prevent adverse overshooting of the selected setpoint temperature.

In particular, a target curve of this invention is described by the formula $Stb = (Tsp - T) \cdot S$ where $Stb$ is the target slope below the setpoint temperature or is the target rate of change of the temperature of the output heating effect of the heating means, $Tsp$ is the desired setpoint temperature, $T$ is the actual temperature of the output temperature effect and $S$ is a selected constant that comprises a sensitivity factor.

Figure 2:
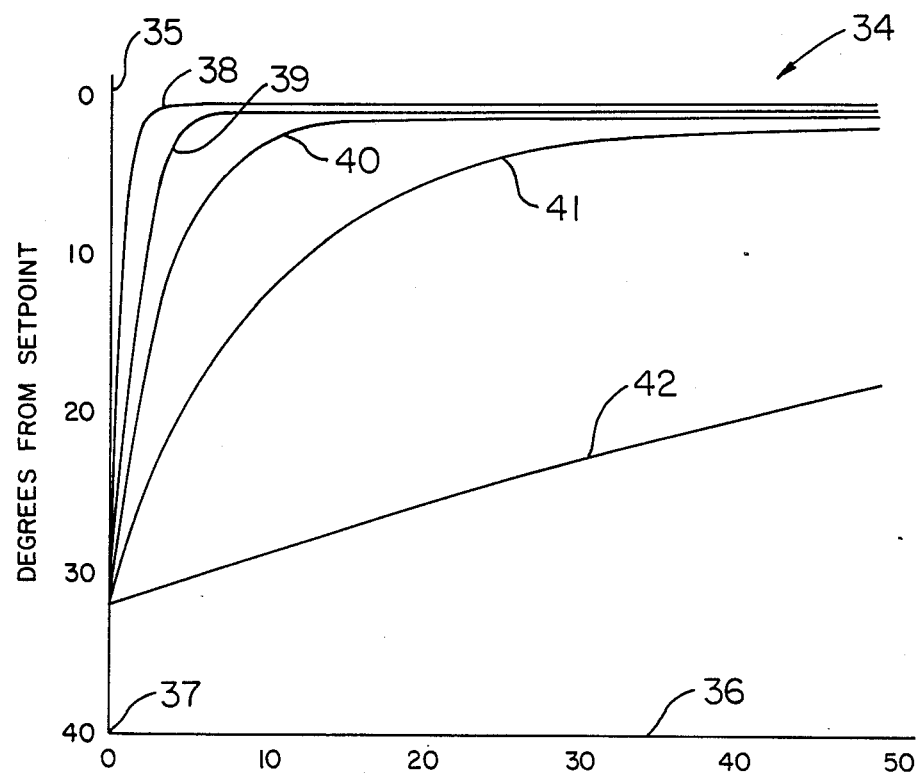
FIG. 2 is a graph illustrating various target curves based on the formula of this invention that is utilized in the control means of FIG. 1.

For example, reference is now made to FIG. 2 wherein a graph is generally indicated by the reference numeral 34 and has its Y axis 35 indicating the degrees from the selected setpoint temperature where zero degrees is the selected setpoint temperature and has the X axis 36 thereof defining time in increasing increments from the origin 37 of the Y and X axes 35 and 36 as illustrated.

Five target curves 38, 39, 40, 41 and 42 are illustrated on the graph 34 and all are derived from the previously set forth formula of this invention, each target curve 38-42 having the same selected setpoint temperature (Tsp) and with the target curve 38 having its S equal to 1.0; the target curve 39 having its S equal to 0.5; the target curve 40 having its S equal to 0.25; the target curve 41 having its S equal to 0.1 and to the target curve 42 having its S equal to 0.01.

From graph 34 it can be seen that all five target curves 38-42 tend to prevent an overshoot of the selected setpoint temperature. However, it is believed that is the target curve is set correctly, the temperature of the cooking oil will rise rapidly to the setpoint temperature with minimum overshoot from startup. Nevertheless, a target curve which is too steep defeats the purpose of the formula and allows considerable overshoot whereas conversely, a very shallow curve results in an excessive number of burner or heater cycles and an extended warmup period. Thus, it was found according to the teachings of this invention that a target curve can be tuned for any given apparatus if the optimum response is desired and it is possible to generate the desired asymptotic curve with the single constant S as illustrated in FIG. 2.

Once the desired target curve has been provided for the particular apparatus 20, the microprocessor 31 is programmed in a manner well known in the art so that the same will compare the actual slope of the changing temperature of the cooking oil 25 in the vat means 24 with the selected target curve to control the operation of the heat producing means 23, the actual slope being calculated by the formula $(Sa = (T - T(n-1))$ where $Sa$ is the actual slope, $T$ is the actual temperature and $T(n-1)$ is a previous temperature measured a fixed number of sample intervals earlier.

Thus, the microprocessor 31 will receive digital signals from the analog to digital convertor 29 that represent the actual temperature being sensed by the temperature sensing means 26 for the oil 25 in the vat means 24 as well as digital signals from the analog to digital convertor 29 concerning the selected set point temperature set by the operator of the setpoint means 30 and perform the necessary calculations to compare the selected target rate of temperature change curve with the actual rate of change curve of the temperature of the cooking oil 25 so that during each sample interval being measured at that particular time by the microprocessor 31, the actual slope is compared with the target slope and if the actual slope is less than the target slope, the heat source 23 is energized (or merely remains energized) and, if the reverse is true, the heat source 23 is turned off whereby the temperature profile of the cooking oil 25 in the vat means 24 is forced by the microprocessor 31 to be substantially the prescribed target curve during the time the same is having the actual temperature thereof increased from a temperature below the selected setpoint temperature to the setpoint temperature.

In this manner, when the heating system 21 of the deep fat fryer 20 is initially turned on after the operator has selected a desired setpoint temperature with the setpoint means 30, the microprocessor 31 will control the heat producing means 23 so that the actual temperature of the cooking oil 25 will rapidly rise when the initial temperature thereof is very low relative to the selected setpoint temperature yet cause the same to approach the final setpoint temperature slowly as the target curve is asymptotic to the selected setpoint temperature and has a "knee", the slope of the target curve and the sharpness of the "knee" thereof for the fryer 20 having been previously selected through the selection of the desired S for the previously set forth formula of this invention.

Thus, for each sample interval being measured by the microprocessor 31 before the actual temperature of the cooking oil 25 in the vat means 24 reaches the selected setpoint temperature, the microprocessor 31 compares the actual rate of change of the temperature of the output heating effect of the heating means 23 with the target rate of change provided by the formula $Stb = (Tsp - T) \cdot S$ where Stb is the target rate of change, Tsp is the desired setpoint temperature, T is the actual temperature of the output heating effect of the heating means 23 and S is the selected constant that comprises a sensitivity factor so that if the actual rate of change is less than the target rate of change, the heat producing means 23 remains on or is turned on whereas if the reverse is true in that the actual rate of change being measured at that time is greater than the target rate of change, the heat producing means 23 is turned off so that the microprocessor 31 forces the temperature profile being provided by the actual temperature of the cooking oil 25 to substantially follow the target rate of change curve that is provided by the previously set forth formula $Stb = (Tsp - T) \cdot S$.

Thus, it can be seen that the constant S of the formula of this invention can be called SENSBS which stands for Sensitivity Below Setpoint. For example, this constant S is multiplied by the distance from setpoint with the resulting value being the required rate of change. In particular, assume that SENSBS is 0.2 and that the temperature is 50° below setpoint. The algorithm formula of this invention therefore states that the temperature should be rising (moving toward setpoint) at a rate of 0.2 times 50 which equals 10° per second. However, assuming that the actual temperature is only 3° below setpoint, in this case the rate of rise should be 0.2 times 3 which equals 0.6° per second. Thus, the desired rate of change is a curve which is asymptotic to the selected setpoint temperature. The rate control algorithm of this invention must make only one simple decision: if the rate of change is less than the desired rate, the heat producing means is to be turned on (or be maintained in an on condition thereof) and if the rate of change is greater than the desired rate, the heat producing means is to be turned off (and this control of the heat producing means is provided by the microprocessor 31 which has been programmed to produce this function as previously set forth). The addition of time hysteresis results in a stable control system.

Obviously at low temperature, the slope of the target curve of this invention is very steep and the cooking oil temperature cannot increase this quickly. This insures that the heat producing means 23 will turn on and stay on. As the temperature of the cooking oil 25 approaches the selected setpoint temperature, at some point the actual temperature will exceed the desired rate of change and the heating means 23 will be turned off the microprocessor 31.

As the actual temperature of the cooking oil 25 continues to coast up to the selected setpoint temperature, it is entirely possible that the rate of change will fall below the prescribed or target rate and in this case the microprocessor 31 will cause the heat producing means 23 to be turned back on. In this manner, the heat producing means 33 will cycle, slowing the rate of temperature rise as the temperature of the cooking oil 25 approaches the selected setpoint and allowing the system 21 to reach the desired temperature with a minimum of overshoot. It has been found through work with various deep fat fryers, the value of S of the formula of this invention can typically be tuned for a single "burn" of the heat producing means 23.

While the structure and operation of the system 21 and control means 22 of this invention have been set forth in a general manner so that a person skilled in the art will fully understand the same, a more detailed discussion of the components and of the operation thereof will now be set forth.

One of the reasons for using the algorithm of this invention is to reduce hardware costs. The key to the reduction is one very simple fact: the formulas involved do not need to know absolute temperature. The rate control algorithm of this invention operates on the difference between desired and actual temperatures, and the rate of change of the latter. This allows the hardware to measure a narrow relative band of temperatures about the setpoint rather than the entire control range.

Temperature, in this particular design, is measured with a thermocouple 26 which is icepoint compensated by a thermocouple amplifier (TCA) 27. The output of the TCA 27 is amplified and level shifted by the thermocouple conditioner (TCC) 28 before being routed to one input of an 8 bit analog to digital convertor (A/D) 29.

A second A/D input is driven by the setpoint potentiometer 30. This control 30 is driven by a buffered setpoint reference (SPR) 30' which is developed from a precision regulator.

The A/D convertor 29 used in one working embodiment of this invention can be programmed to measure differentially or in a single-ended mode. By using the differential capabilities, one can measure the difference between the temperature and setpoint inputs with 8 bits of accuracy. Further, one can have the capability of specifying which of the differential inputs is positive. If a reading is taken and the result is zero (indicating a possibly negative reading), the relationship of the imputs is reversed and the reading is taken again, resulting in an effective 9 bits of resolution.

Due to the scaling applied to the thermocouple output relative to the setpoint pot 30, this differential input covers a range of approximately 140 degrees below setpoint to 20 degrees above setpoint in ⅓ degree increments. The range of measurement was purposely offset to best suit the application. It has been found according to the teachings of this invention that it is desired to be able to measure as far below the setpoint as possible in order to properly control overshoot and load recovery using the rate control algorithm of this invention.

Above the setpoint one does not need as wide a range, since there is no way to forcibly cool the cooking oil 25. A range of five or ten degrees would be quite sufficient for normal steady-state control; the wider 20 degree window is needed primarily for load anticipation. Above the setpoint the rate of temperature fall is monitored and compared with a linear target curve. If a load is placed in the cooking oil the temperature will begin dropping rapidly, and the rate control algorithm of this invention will turn the heat producing means 23 on as soon as it exceeds the specified rate of fall. In this manner the control means 22 is able to energize the heat source before the temperature has dropped to the setpoint, resulting in significantly improved performance.

By reading the thermocouple circuit in single-ended mode, one can also obtain an absolute temperature reading. Due to the small word size of the A/D convertor 29, this reading will be within a limited window of approximately 130 to 209 degrees. This is useful for controlling melt mode (a slow, limited-heat cycle for warming solid shortening).

One can also read the setpoint pot 30 directly. This allows the control means 22 to detect a "standby" condition: if the setpoint pot 30 is turned below a minimum value, the fryer control means 22 shuts down and waits for the setpoint to be raised.

Reading the setpoint pot 30 directly also allows the control means 22 to refine the rate control algorithm slightly. At lower setpoint temperatures, the loss of heat to ambient is slower, which affects the optimum target curve. By scaling the sharpness of the curve at lower setpoints, one can compensate for this phenomenon. Because of the scaling of the pot, the control means 22 can read setpoints of up to 270 degrees and use this data to flatten the curve as necessary.

The A/D section 29 just described handles all data acquisition except the function of the high temperature limit (HTL) 33. This test requires a direct reading of temperatures in excess of 400 degrees, which is not within the range in any mode. For this reason, a dedicated hardware comparator 33 is is driven by the TCA output. Set for approximately 415 degrees, this comparator 33 drives an input of the microprocessor (CPU) 31 as well as a redundant relay control transistor of the relay means 32.

Using the temperature information provided by the A/D convertor 29 and high temperature sensor, the microprocessor 31 controls the system's heat producing means 23 via a relay means 32 driven by an open collector buffer and the high temperature limit transistor whereby both devices must be enabled in order for the relay means 32 to energize.

In designing one working embodiment of the control means 22 of this invention, it was desired to eliminate trim pots and interactive adjustments whereby a wirewound potentiometer was selected for the setpoint means 30 because of improved temperature stability thereof.

After weighing the various factors it was decided to use a mechanical to thermal ratio of 1.28:1 degrees. This results in the 200 degree control range (200–400 degrees F.) spanning 256 mechanical degrees on the setpoint pot 30.

By defining the exact center of rotation as 300 degrees, one is left with roughly nine degrees of mechanical rotation on either end of the control range. This extra range is used for field trimming.

All of the devices in the heating system 21 of this invention are powered by a five volt supply whereby careful consideration was given to the voltage ranges of all signals. Calculations reveal that, by using a setpoint reference of slightly less than four volts, the desired sensing range can be achieved with maximum resolution. Therefore, the top (clockwise end) of the setpoint pot 30 is driven with a reference voltage of 3.906 volts. This reference is generated by a voltage divider which is fed by the output of a five volt precision reference. This results in a transfer function of 17.9 mV/degree F.

In regard to the thermocouple conditioner 28, it was found that with the difference between setpoint and temperature, the temperature transfer function should be the same as that of the setpoint pot 30. The setpoint 30 produces 17.9 mV/degree F. The TCA 27, on the other hand, produces 5.555 mV/degree F. This is a difference of 3.214:1, so one must amplify the thermocouple output by this factor. Unfortunately, due to the five volt power supply, this would limit the maximum readable temperature to 5V/3.214=1.555/10 mV=155.5 degrees C. or 312 degrees F. Since much of the lower range is unused, this is corrected by moving the usable window. In particular, the output is offset such that 130 degrees F. into the thermocouple 26 will result in zero volts out of the conditioner 29.

Since there are now two outputs with the same transfer function of 17.0 mV/degree F., these signals are used as inputs to the A/D convertor 29. One must now select a resolution for the convertor. Since one is interested solely in the difference between these two signals, the tradeoff will be between resolution and the width of the error band that can be sensed. If a sensitivity of 5.55 mV/step (as if the A/D convertor 29 were directly reading the TCA) is used, a resolution of 1/3.214 or 0.3111 degrees per bit will be provided. This selection results in a reference voltage of 256·0.00555=1.422 volts for the A/D convertor 29. This voltage can be developed internally in the case of an A/D convertor 29 with a programmable reference.

By using the differential amplifier built into the A/D convertor 29, a byte of data which represents the distance between setpoint and temperature can be developed. Further, by determining which input is positive and which is negative when commanding the A/D convertor 29 to take a reading, this will result in twice the range otherwise available. With a resolution of 0.3111 degrees per step and 2·256 available counts, a range of 160 degrees total will be covered.

Since there is no method of cooling the cookinh oil, information about the distance of temperature ABOVE setpoint is for the most part lost. If one, therefore, splits the 160 degrees evenly, the 80 degrees above setpoint would be a waste. If one could instead offset this band so that most of the range is temperature below setpoint, one would be able to turn off much sooner and control more accurately. The offset of the TCA conditioner 27 relative to the setpoint pot 30 performs this function, and this was one of the reasons for choosing 130 degrees to be zero volts out. When the temperature and setpoint are equal, a difference voltage of just over one volt will be at the A/D convertor 29. If this value is interpreted as equality, then a temperature over the range of setpoint plus 20 and minus 140 degrees can be measured.

This is, in fact, the method used to calibrate the system 21. The pot 30 is set to half rotation (300 degrees) and a voltage equivalent to 300 degrees is applied to the thermocouple input of the A/D convertor 29. The readings from the A/D convertor 29 become the equality point between setpoint and thermocouple. In this manner, mechanical trim adjustments are completely eliminated.

Standby mode requires the reading of the setpoint directly. Although the ranges selected do not allow the pot 30 to be read, the lower end can be read by specifying single-ended input for that channel. Full CCW rotation on the pot 30 produces zero volts out, so the pot 30 can be read for some arbitrary small value, which will indicate that the pot 30 is rotated off the stop.

Similarly, melt mode requires the temperature to be read directly. Again, only a small portion of the temperature range can be read directly, beginning at 130 degrees and extending to $256 \cdot 0.311 + 130 = 209$ degrees. (This was another reason for selecting 130 degrees as zero out; it defines the melt sensing range.) The thermocouple 26 in single-ended mode can be watched for any preset temperature within this range and terminate melt mode at that temperature.

Although the rate control algorithm of this invention does not require a knowledge of absolute temperature, it has been found that the response of a deep fat fryer will vary significantly depending on the temperature of the cooking oil. The result of this is that a shallower curve is needed at lower temperatures to maintain a given overshoot. A refinement to the algorithm is to apply a scaling factor to the curve which is related to the absolute temperature.

If the thermocouple 26 could be read directly, one could read up to 209 degres, but this just barely gets into the control range. Instead, the setpoint value can be read (for it is the setpoint value which ultimately determines where the curve will be placed). Since the bottom of the setpoint pot 30 is roughly equivalent to 191 degrees, one can sense up to $256 \cdot 0.3111 = 270$ degrees. Across this range a scaling factor is simply applied to the curve such that lower setpoints produce shallower curves.

Therefore, it can be seen that this invention not only provides a new control means, a new heating system and a new deep fat fryer, but also this invention provides new methods of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a heating system comprising a heat producing means, temperature sensing means for sensing the actual temperature of the output heating effect of said heat producing means, setpoint means for selecting a final desired setpoint temperature that said heat producing means is to provide with said output heating effect thereof, and control means operatively interconnected to all of the other said means to tend to cause said heat producing means to provide said desired setpoint temperature with said output heating effect thereof, the improvement wherein said control means has means for turning off said heat producing means if the actual rate of change of the temperature of said output heating effect thereof is greater than a target rate of change thereof when said actual temperature of said output heating effect at that time is below said desired setpoint temperature and to turn on said heat producing means if said actual rate of temperature change of said output heating effect thereof is less than said target rate of change when said actual temperature of said output heating effect thereof at that said time is below said desired setpoint temperature where said target rate of change is derived from the formula $Stb = (Tsp - T) \cdot S$ where Stb is said target rate of change, Tsp is said desired setpoint temperature, T is said actual temperature of said output heating effect at that said time and S is a selected constant that comprises a sensitivity factor.

2. A heating system as set forth in claim 2 wherein said constant is less than one and is greater than zero.

3. A heating system as set forth in claim 1 wherein said control means comprises a microprocessor and an analog to digital convertor operatively interconnected to said microprocessor, said temperature sensing means being operatively interconnected to said convertor, said setpoint means being operatively interconnected to said convertor.

4. A heating system as set forth in claim 3 wherein said temperature sensing means comprises a thermocouple, said control means comprising a thermocouple amplifier operatively interconnecting said thermocouple to said convertor.

5. A heating system as set forth in claim 4 wherein said control means comprises a thermocouple amplifier conditioner that operatively interconnects said thermocouple amplifier to said microprocessor.

6. A heating system as set forth in claim 1 wherein said control means comprises a microprocessor and wherein said microprocessor calculates said actual rate of temperature change by the formula $Sa = (T - T(n-1))$ where Sa is said actual rate of change, T is said actual temperature at that said time and $T(n-1)$ is a previous actual temperature measured a fixed number of sample intervals earlier.

7. In a control means for a heating system that has a heat producing means, said control means comprising temperature sensing means for sensing the actual temperature of the output heating effect of said heat producing means, and setpoint means for selecting a final desired setpoint temperature that said heat producing means is to provide with said output heating effect thereof, said control means having means to tend to cause said heat producing means to provide said desired setpoint temperature with said output heating effect thereof, the improvement wherein said control means has means for turning off said heat producing means if the actual rate of change of the temperature of said output heating effect thereof is greater than a target rate of change thereof when said actual temperature of said output heating effect at that time is below said desired setpoint temperature and to turn on said heat producing means if said actual rate of temperature change of said output heating effect thereof is less than said target rate of change when said actual temperature of said output heating effect thereof at that said time is below said desired setpoint temperature where said target rate of change is derived from the formula $Stb=(Tsb-T)\cdot S$ where Stb is said target rate of change, Tsp is said desired setpoint temperature, T is said actual temperature of said output heating effect at that said time and S is a selected constant that comprises a sensitivity factor.

8. A control means as set forth in claim 7 wherein said constant is less than one and is greater than zero.

9. A control means as set forth in claim 7 wherein said control means comprises a microprocessor and an analog to digital convertor operatively interconnected to said microprocessor, said temperature sensing means being operatively interconnected to said convertor, said setpoint means being operatively interconnected to said convertor.

10. A control means as set forth in claim 9 wherein said temperature sensing means comprises a thermocouple, said control means comprising a thermocouple amplifier operatively interconnecting said thermocouple to said convertor.

11. A control means as set forth in claim 10 wherein said control means comprises a thermocouple amplifier conditioner that operatively interconnects said thermocouple amplifier to said microprocessor.

12. A control means as set forth in claim 7 wherein said control means comprises a microprocessor and wherein said microprocessor calculates said actual rate of temperature change by the formula $Sa=(T-T(n-1))$ where Sa is said actual rate of change, T is said actual temperature and $T(n-1)$ is a previous actual temperature measured a fixed number of sample intervals earlier.

13. In a deep fat fryer comprising vat means for containing cooking oil, heat producing means for heating said oil, and a control means for controlling the operation of said heat producing means, said control means comprising temperature sensing means for sensing the actual temperature of said oil in said vat means, and setpoint means for selecting a final desired setpoint temperature for said oil in said vat means that said heat providing means is to tend to maintain, said control means having means to tend to cause said heat producing means to provide said desired setpoint temperature for said oil, the improvement wherein said control means has means for turning off said heat producing means if the actual rate of change of the temperature of said oil is greater than a target rate of change thereof when said actual temperature of said oil at that time is below said desired setpoint temperature and to turn on said heat producing means if said actual rate of temperature change of said oil is less than said target rate of change when said actual temperature of said oil at that said time is below said desired setpoint temperature where said target rate of change is derived from the formula $Stb=(Tsp-T)\cdot S$ where Stb is said target rate of change, Tsp is said desired setpoint temperature, T is said actual temperature of said oil at that said time and S is a selected constant that comprises a sensitivity factor.

14. A deep fat fryer as set forth in claim 13 wherein said constant is less than one and is greater than zero.

15. A deep fat fryer as set forth in claim 13 wherein said control means comprises a microprocessor and an analog to digital convertor operatively interconnected to said microprocessor, said temperature sensing means being operatively interconnected to said convertor, said setpoint means being operatively interconnected to said convertor.

16. A deep fat fryer as set forth in claim 15 wherein said temperature sensing means comprises a thermocouple, said control means comprising a thermocouple amplifier operatively interconnecting said thermocouple to said convertor.

17. A deep fat fryer as set forth in claim 16 wherein said control means comprises a thermocouple amplifier conditioner that operatively interconnects said thermocouple amplifier to said microprocessor.

18. A deep fat fryer as set forth in claim 13 wherein said control means comprises a microprocessor and wherein said microprocessor calculates said actual rate of temperature change by the formula $Sa=(T-T(n-1))$ where Sa is said actual rate of change, T is said actual temperature and $T(n-1)$ is a previous actual temperature measured a fixed number of sample intervals earlier.

19. In a method of making a heating system comprising the steps of providing a heat producing means, providing temperature sensing means for sensing the actual temperature of the output heating effect of said heat producing means, providing setpoint means for selecting a final desired setpoint temperature that said heat producing means is to provide with said output heating effect thereof, and forming control means to be operatively interconnected to all of the other said means to tend to cause said heat producing means to provide said desired setpoint temperature with said output heating effect thereof, the improvement comprising the step of forming said control means to have means for turning off said heat producing means if the actual rate of change of the temperature of said output heating effect thereof is greater than a target rate of change thereof when said actual temperature of said output heating effect at that time is below said desired setpoint temperature and to turn on said heat producing means if said actual rate of temperature change of said output heating effect thereof is less than said target rate of change when said actual temperature of said output heating effect thereof at that said time is below said desired setpoint temperature where said target rate of change is derived from the formula $Stb=(Tsp-T)\cdot S$ where Stb is said target rate of change, Tsp is said desired setpoint temperature, T is said actual temperature of said output heating effect at that said time and S is a selected constant that comprises a sensitivity factor.

20. In a method of making a control means for a heating system that has a heat producing means, said method comprising the steps of forming said control means to comprise temperature sensing means for sensing the actual temperature of the output heating effect of said heat producing means and setpoint means for selecting a final desired setpoint temperature that said heat producing means is to provide with said output heating effect thereof, and forming said control means to have means to tend to cause said heat producing means to provide said desired setpoint temperature with said output heating effect thereof, the improvement comprising the step of forming said control means to have means for turning off said heat producing means if the actual rate of change of the temperature of said output heating effect thereof is greater than a target rate of change thereof when said actual temperature of said output heating effect at that time is below said desired setpoint temperature and to turn on said heat producing means if said actual rate of temperature change of said output heating effect thereof is less than said target rate of change when said actual temperature of said output heating effect thereof at that said time is below said desired setpoint temperature where said target rate of change is derived from the formula $Stb=(Tsp-T) \cdot S$ where Stb is said target rate of change, Tsp is said desired setpoint temperature, T is said actual temperature of said output heating effect at that said time and S is a selected constant that comprises a sensitivity factor.

21. In a method of making a deep fat fryer comprising the steps of providing vat means for containing cooking oil, providing heat producing means for heating said oil, forming a control means for controlling the operation of said heat producing means, forming said control means to comprise temperature sensing means for sensing the actual temperature of said oil in said vat means and setpoint means for selecting a final desired setpoint temperature for said oil in said vat means that said heat producing means is to tend to maintain, and forming said control means to have means to tend to cause said heat producing means to provide said desired setpoint temperature for said oil, the improvement comprising the step of forming said control means to have means for turning off said heat producing means if the actual rate of change of the temperature of said oil is greater than a target rate of change thereof when said actual temperature of said oil at that time is below said desired setpoint temperature and to turn on said heat producing means if said actual rate of temperature change of said oil is less than said target rate of change when said actual temperature of said oil at that said time is below said desired setpoint temperature where said target rate of change is derived from the formula $Stb=(Tsp-T) \cdot S$ where Stb is said target rate of change, Tsp is said desired setpoint temperature, T is said actual temperature of said oil at that said time and S is a selected constant that comprises a sensitivity factor.

* * * * *